(12) United States Patent
Imai

(10) Patent No.: US 8,186,690 B2
(45) Date of Patent: May 29, 2012

(54) METAL GASKET

(75) Inventor: Toshihiro Imai, Tokyo (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 662 days.

(21) Appl. No.: 12/285,487

(22) Filed: Oct. 7, 2008

(65) Prior Publication Data
US 2009/0184478 A1    Jul. 23, 2009

(30) Foreign Application Priority Data

Oct. 12, 2007 (JP) ................................ 2007-266709

(51) Int. Cl.
*F02F 11/00* (2006.01)
(52) U.S. Cl. ....................................................... 277/595
(58) Field of Classification Search ........... 277/593–595
See application file for complete search history.

(56) References Cited

U.S. PATENT DOCUMENTS

| | | | | |
|---|---|---|---|---|
| 6,139,025 A * | 10/2000 | Miyaoh | ......................... | 277/593 |
| 6,705,619 B2 * | 3/2004 | Miyaoh | ......................... | 277/594 |
| 7,311,310 B2 * | 12/2007 | Diez et al. | ..................... | 277/594 |
| 2004/0130102 A1 * | 7/2004 | Ueta et al. | ..................... | 277/593 |

* cited by examiner

*Primary Examiner* — Vishal Patel
(74) *Attorney, Agent, or Firm* — Manabu Kanesaka

(57) ABSTRACT

A metal gasket includes at least one structural plate having a sealing bore and bolt holes located around the seal bore. An inner bead is formed on the at least one structural plate to surround the sealing bore. The inner bead has first neighboring portions near the bolt holes and first outer portions outside the first neighboring portions. The first neighboring portion has a compression resistance smaller than that of the first outer portion. An outer bead is formed on the at least one structural plate to surround the inner bead such that the bolt holes are located inside thereof. The outer bead has second neighboring portions near the bolt holes and second outer portions outside the second neighboring portions. The second neighboring portion has a compression resistance greater than that of the second outer portion.

10 Claims, 6 Drawing Sheets

METAL GASKET

BACKGROUND OF THE INVENTION AND RELATED ART STATEMENT

The present invention relates to a metal gasket sandwiched between two members for sealing therebetween, and more specifically, a metal gasket being able to obtain an substantially equal sealing surface pressure all around a sealing bore while controlling a deformation of members sandwiching the metal gasket such as a deformation of a cylinder bore, flange or the like.

Cylinder head gaskets or gaskets for intake and exhaust manifolds are used in a state of being sandwiched between a cylinder head and a cylinder block (cylinder body) of an automobile engine, or between the intake manifold and the intake pipe and between the exhaust manifold and the exhaust pipe; and are tightened by fastening bolts to seal fluid such as combustion gas, oil, coolant water and the like.

Due to a recent lightweight and downsized engine, the engine has a low rigidity, and engine members have also low rigidities. As a result, a deformation can occur in the sealing bore such as the cylinder bore, flange or the like, or the periphery portion thereof. If the cylinder bore, flange or the like is deformed, a sealing means such as beads or the like does not function completely, so that adequate sealing performance cannot be obtained.

As one of countermeasures with respect to the above-mentioned problem, the following metal laminate gasket is proposed. A first bead is provided inside a folded portion, and a second bead is provided on the outer-periphery side of the first bead. The folding width of the folded portion away from a tightening bolt is formed narrower than that of neighboring portion of the tightening bolt. In addition, the bead width of one of the first bead or the second bead, or both the first bead and the second bead, is formed narrower at a portion away from the tightening bolt than the neighboring portion of the tightening bolt (for example, refer to Japanese Patent Publication (TOKKAI) No. H11-118037).

The metal laminate gasket with the above-mentioned structure equalizes the tightening load, prevents the deformation of a bore, and has an excellent gas sealing performance. However, the first bead and the second bead are provided on a sealing bore side rather than the neighboring portion of the bolt hole, and also width of an inside folded portion and the first bead or the second bead is all formed wide at the portion away from the tightening bolt in the same way. As a result, depending on the shape of a sealing member or the type of a gasket, the second bead, which has wide neighboring portion of the bolt hole and a relatively small compression resistance, might receive a fastening force applied to the neighboring portion of the bolt hole, thereby becoming flattened. Consequently, the first bead also might be flattened.

An object of the present invention is to provide a metal gasket which can obtain an approximately equal sealing surface pressure all around the sealing bore by combining inner-periphery side bead and outer-periphery side bead whose compression resistances change in the periphery direction; provide excellent sealing abilities; and control a flexural deformation of the cylinder head or the flanges of the intake and exhaust manifolds which are joint surfaces.

Further objects and advantages of the invention will be apparent from the following description of the invention.

SUMMARY OF THE INVENTION

In order to achieve the object described above, a metal gasket according to the invention includes one or multiple sheets of metal structural plates, and is provided with a bolt hole around a sealing bore, and an inner-periphery side bead and an outer-periphery side bead surrounding the periphery of the sealing bore. In the inner-periphery side bead, a neighboring portion of the bolt hole has a smaller compression resistance than that of the other portions. The outer-periphery side bead is provided in such a way that the bolt hole is located inside the outer-periphery side bead at the neighboring portion of the bolt hole in a plan view. In the periphery portion of the bolt hole, the compression resistance of the bead is larger than that of the other portions.

According to the above-mentioned structure, in the inner-periphery side bead forming a primary seal, the neighboring portion of the bolt hole, wherein the impact of the bolt fastening force is strong and the sealing surface pressure is apt to be large, can obtain a compressibility and a very low surface pressure by reducing the compression resistance. On the other hand, in the portion between the bolt holes, wherein the impact of the bolt fastening force is weak and the sealing surface pressure is apt to be small, a high surface pressure can be obtained by increasing the compression resistance. Thus, a sealing surface pressure which is approximately equal all around the sealing bore can be obtained, so that excellent sealing performance can be obtained. Also, a deformation of the sealing bore or the neighboring portion thereof, for example, a bore deformation in a cylinder head gasket, a flange deformation in intake and exhaust manifolds, and the like can be prevented.

Also, in the outer-periphery side bead forming a secondary seal, the neighboring portion of the bolt hole, wherein the impact of the bolt fastening force is strong and the sealing surface pressure is apt to be large, can further increase the sealing surface pressure by increasing the compression resistance, and control a flexural deformation of a cylinder head or the flange of the intake and exhaust manifolds which is a joint surface of the metal gasket. On the other hand, in the portion between the bolt holes wherein the impact of the bolt fastening force is weak and the sealing surface pressure is apt to be small, the low surface pressure can be obtained by reducing the compression resistance, so that the compressibility and compatibility can be enhanced, and sealing abilities can be improved.

Especially, the outer-periphery side bead is extended to the outside of the bolt holes in such a way that the bolt hole is located inside the outer-periphery side bead at the neighboring portion of the bolt hole in a plan view. As a result, compared to a case wherein the bead is arranged inside the bolt hole in a plan view, the outer-periphery side bead is arranged along a wide range of the periphery of the bolt hole, so that the above-mentioned relatively long bead can receive a compressing force by a fastening bolt. Therefore, the outer-periphery side bead wherein the compressibility is formed relatively high at the above-mentioned long bead can share a tightening force by a fastening force. Thus, flattening of the outer-periphery side bead can be prevented.

The inner-periphery side bead and the outer-periphery side bead, whose compression resistances are changed in the periphery direction, are combined, so that in the neighboring portion of the bolt hole or the other portion thereof (between the bolt holes and the like), when the bead on one side is formed with a small compression resistance, the bead on the other side is formed with a large compression resistance. As a result, in an overall structure of a result of the combination of both beads, more consistent sealing surface pressure can be obtained. Therefore, more excellent sealing abilities can be obtained, and also a flexural deformation of the cylinder head, the flange of the intake and exhaust manifolds or the like, which is a joint surface, can be controlled.

According to the above-mentioned metal gasket, in the inner-periphery side bead, the neighboring portion of the bolt hole has the bead wider than those of the other portion, so that the compression resistance of the bead is small. Also, in the outer-periphery side bead, the neighboring portion of the bolt hole has the bead narrower than those of the other portion, so that the compression resistance of the bead is large. According to the structure, with a relatively simple structure, the above-mentioned structure can be implemented.

More specifically, in the metal gasket, two or more sheets of metal structural plates are laminated. In the respective two sheets of first and second metal structural plates which are abutted against each other, the inner-periphery side beads are formed of half beads with slopes whose inner periphery sides become apart each other and whose outer periphery sides become close with respect to each other. In one of the two sheets of metal structural plates, the outer-periphery side bead is formed by a half bead with a slope whose inner periphery side becomes close to the other metal structural plate and whose outer periphery side becomes apart toward the opposite side of the other metal structural plate. Also, the metal structural plates are formed in such a way that the inner-periphery side beads overlap each other in a plan view.

Also, in the metal gasket, in addition to the two sheets of metal structural plates, a third metal structural plate is laminated. In the third metal structural plate, in a plan view, inner-periphery side bead, overlapping the inner-periphery side beads of the first and second metal structural plates, is formed of a half bead such that the inner periphery side thereof inclines toward the first metal structural plate, and that the outer periphery side inclines toward the opposite side of the first metal structural plate. Alternatively, in the metal gasket, two pairs of two metal structural plates are laminated symmetrically with respect to each other relative to a laminated surface.

Incidentally, the metal gasket can be especially effective for the cylinder head gasket which is used between a cylinder block and a cylinder head for an engine member; a gasket for an intake manifold which is used between the intake manifold of the engine member and an intake pipe; a gasket for an exhaust manifold which is used between an exhaust manifold of the engine member and an exhaust pipe, or the like. Also, in the metal gasket for the intake and exhaust manifolds, the flange can be easily deformed due to a fastening force applied to the bolt hole, so that the application of the metal gasket of the invention is more preferable.

According to the metal gasket of the invention, the inner-periphery side bead and the outer-periphery side bead, whose compression resistances are changed in the periphery direction, are combined, so that in the neighboring portion of the bolt hole or the other portion thereof (between the bolt holes and the like), when one of the beads is formed with a small compression resistance, the other of the beads is formed with a large compression resistance. As a result, in the overall structure, an approximately equal sealing surface pressure can be obtained. Thus, excellent sealing abilities can be obtained, and also the flexural deformation of the joint surface can be controlled.

DETAILED DESCRIPTION OF PREFERRED EMBODIMENTS

Figure 1:
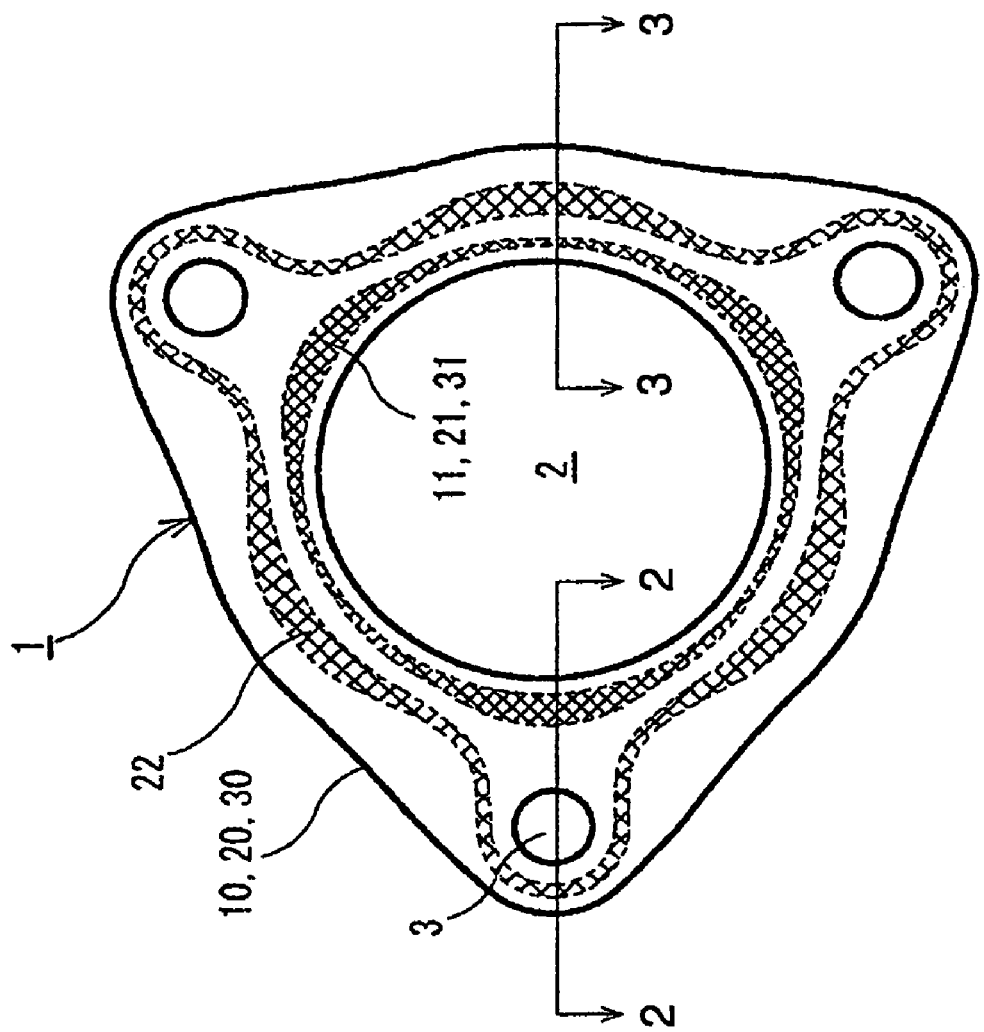
FIG. 1 is a plan view showing a metal gasket of the first embodiment of the present invention.

Hereunder, embodiments of a metal gasket according to the present invention will be described with reference to the attached drawings. Incidentally, FIGS. 1 to 6 are schematic explanatory views in which thicknesses of substrates, sizes of sealing bores, beads and so on are different from actual ones and enlarged for the sake of explanation.

Here, as the metal gasket, a metal gasket for an exhaust manifold is explained as an example. However, this invention is not limited to the above-mentioned metal gasket, and can be applied to the other metal gasket such as a metal gasket for an intake manifold, a cylinder head gasket or the like.

For example, the metal gasket of the invention is a metal gasket sandwiched between the exhaust manifold for an engine and a flange of an exhaust pipe, and seals combustion gas having a high temperature and a high pressure exhausted through the engine.

As shown in FIGS. 1 to 6, metal gaskets 1, 1A include one or multiple sheets of metal structural plates (metal substrates) formed of a mild steel plate, a stainless annealed material (anneal material), stainless thermal refining steel material (spring steel plate), and the like. Also, the metal gaskets 1, 1A are manufactured in accordance with a shape of a joint flange of the exhaust manifold, and sealing bores 2 and bolt holes 3 for a fastening head bolt are formed.

The metal gaskets 1, 1A are formed with two sheets of metal structural plates 10, 20. In the two sheets of metal structural plates 10, 20, i.e. the respective first metal structural plate 10 and the second metal structural plate 20, with respect to the sealing bores 2, inner-periphery side beads 11, 21 are formed with a half bead with a slope such that an inner periphery side thereof becomes separated from and an outer periphery side thereof becomes abutted against each other. These inner-periphery side beads 11, 21 overlap each other in a plan view.

In the inner-periphery side beads 11, 21, neighboring portions of the bolt holes 3 are formed wider than the other portions, so that the compression resistance of the beads 11, 21 is small. More specifically, bead widths Wa 1 (FIGS. 2, 5) near the bolt holes 3 of the inner-periphery side beads 11, 21 are formed wider than bead widths Wb 1 (FIGS. 3, 6) of the other portions such as portions between the bolt holes 3 and the like. For example, the maximum bead width is approximately 1.5 to 2.5 times of the minimum bead width.

Also, in the other second metal structural plate 20, outer-periphery side bead 22 is formed with a half bead with a slope such that an inner periphery side thereof becomes abutted against a first metal structural plate 10, and that an outer periphery side thereof inclines toward the opposite side of the first metal structural plate 10. In a plan view, the outer-periphery side bead 22 is arranged on the outer periphery side of the inner-periphery side beads 11, 21, and extended to the outside of the bolt hole 3 in such a way that the bolt hole 3 is situated inside the outer-periphery side bead 22 at the neighboring portion of the bolt hole 3. The outer-periphery side bead 22 of these portions has also a role as a stopper for the bolt hole 3.

In the outer-periphery side bead 22, the width of the bead of the neighboring portion of the bolt hole 3 is formed narrower than that of the other portions, so that the compression resistance of the bead becomes large. More specifically, bead width Wa 2 (FIGS. 2, 5) near the bolt hole 3 of the outer-periphery side bead 22 is formed narrower than bead width Wb 2 (FIGS. 3, 6) of the other portions such as the portion between the bolt holes 3 and the like. For example, the maximal bead width is approximately 1.5 to 2.5 times larger than the minimal bead width.

Figure 2:
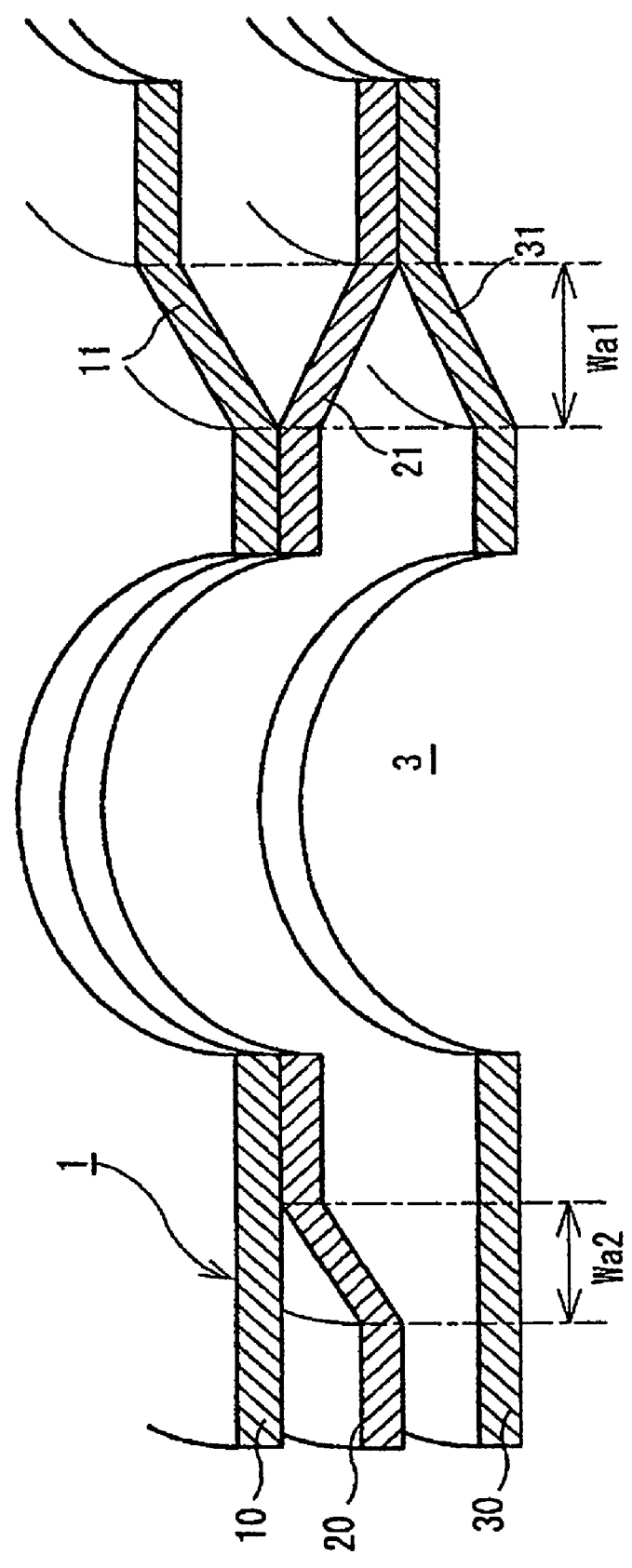
FIG. 2 is a partially enlarged sectional view taken along line 2-2 in FIG. 1.
Figure 3:
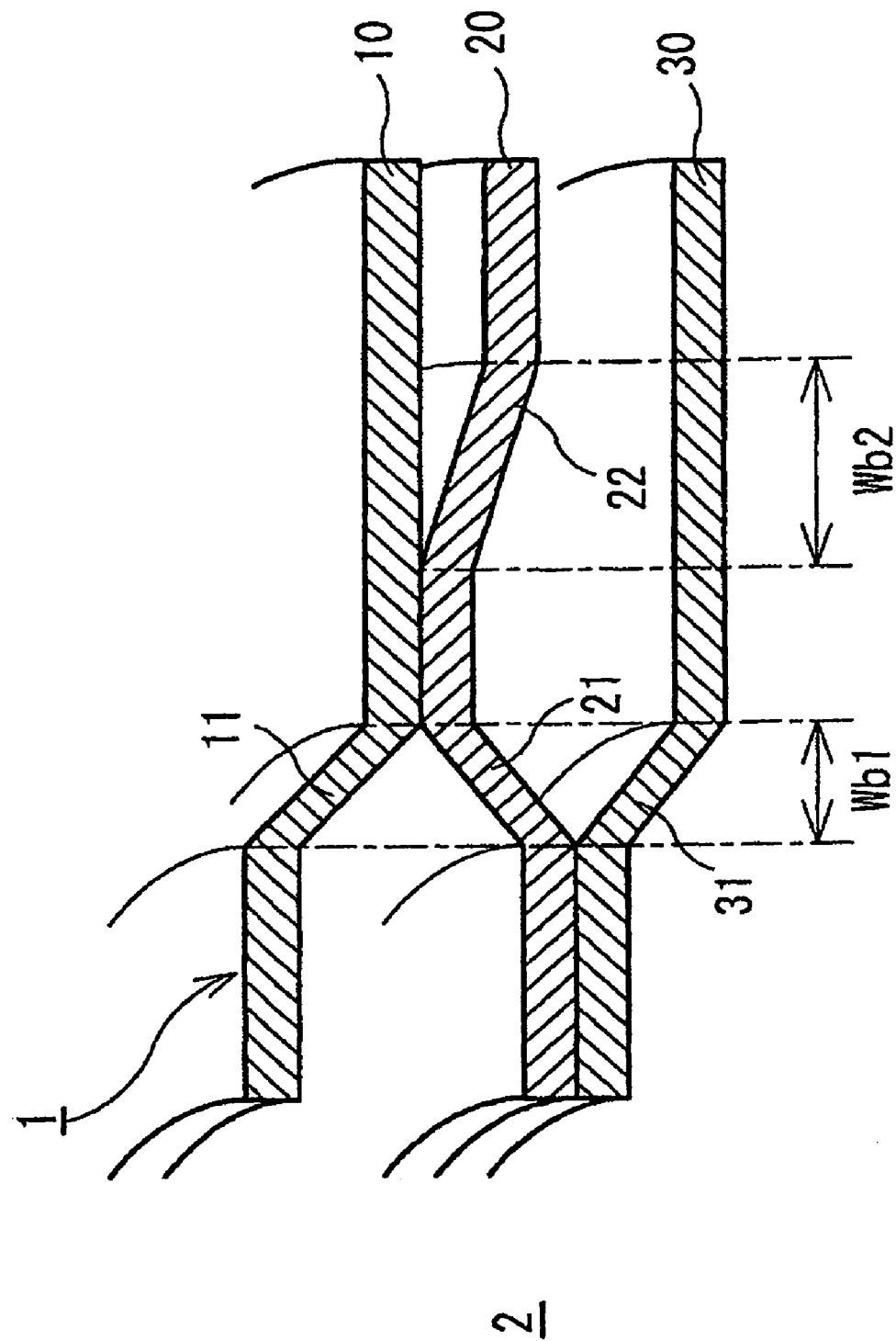
FIG. 3 is a partially enlarged sectional view taken along line 3-3 in FIG. 1.
Figure 4:
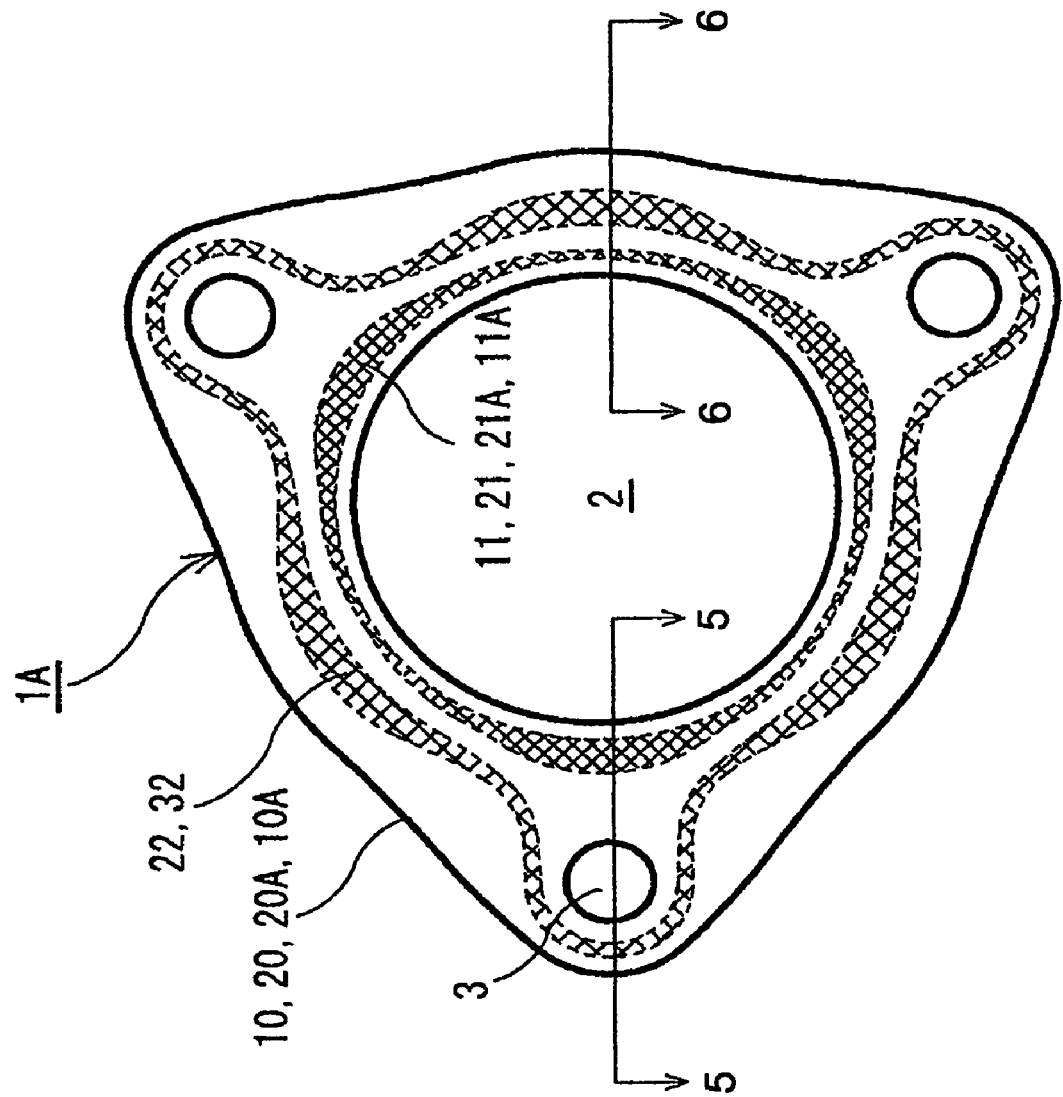
FIG. 4 is a plan view showing the metal gasket of the second embodiment of the present invention.

In the metal gasket 1 of the first embodiment shown in FIGS. 1 to 3, in addition to the above-mentioned two sheets of the first and second metal structural plates 10, 20, the third metal structural plate 30 is laminated. In the third metal structural plate 30, in a plan view, the inner-periphery side bead 31 is formed with the half bead with the slope such that an inner periphery side becomes abutted against the first metal structural plate 10 and that an outer periphery side thereof inclines toward the opposite side of the first metal structural plate 10. The inner-periphery side bead 31 overlaps with the inner-periphery side beads 11, 21 of the first and second metal structural plates 10, 20 in a plan view.

Figure 5:
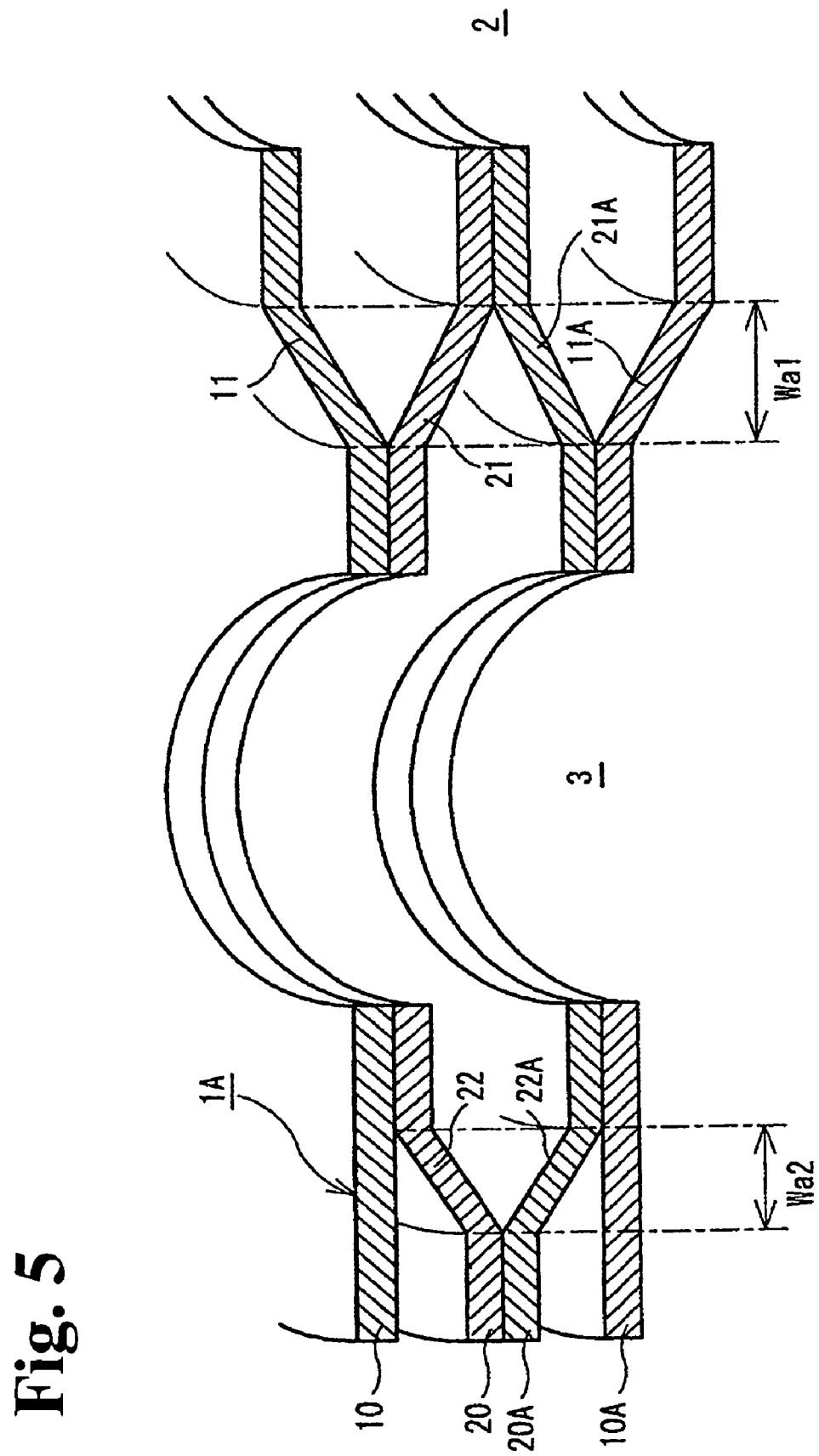
FIG. 5 is a partially enlarged sectional view taken along line 5-5 in FIG. 4.
Figure 6:
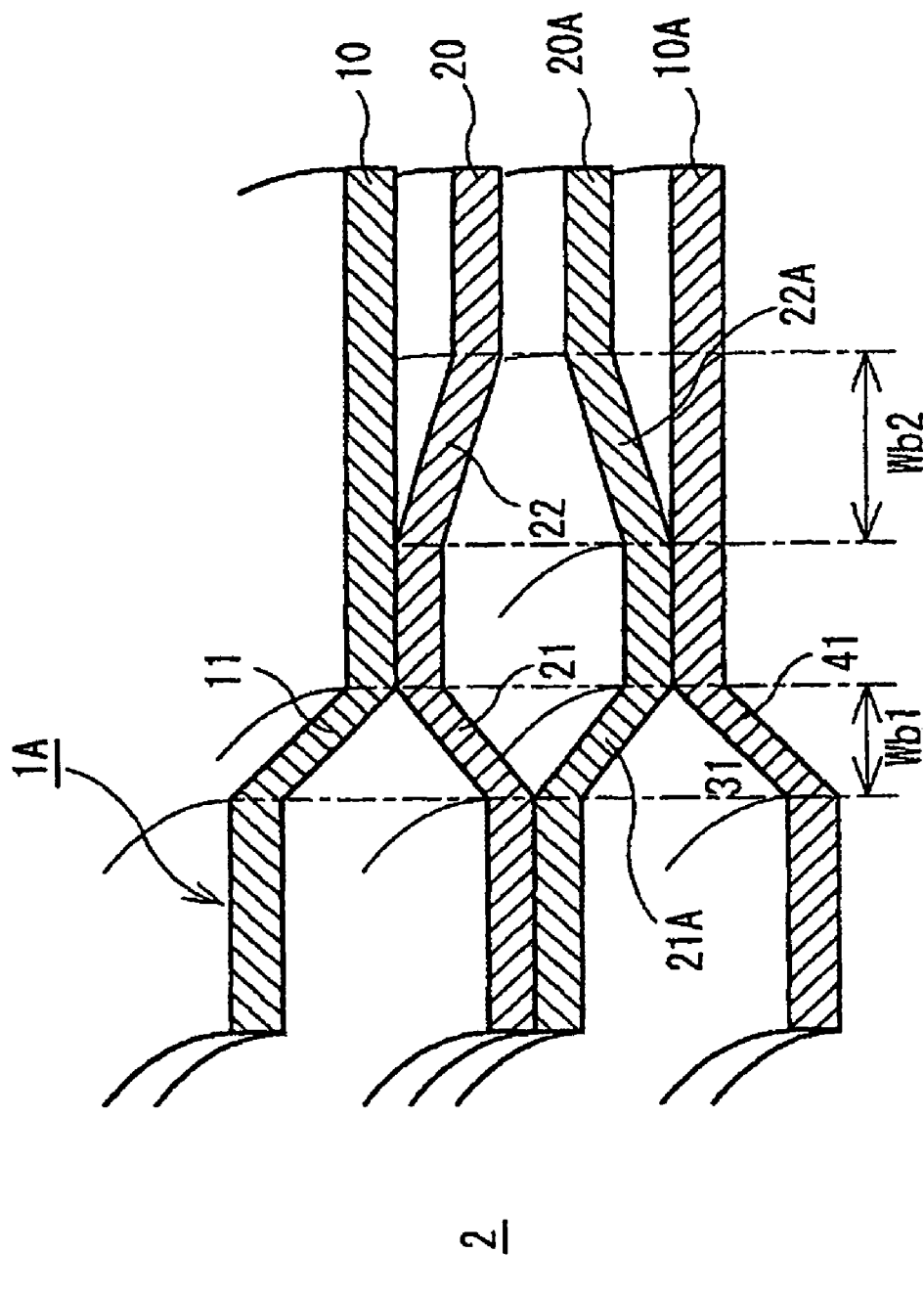
FIG. 6 is a partially enlarged sectional view taken along line 6-6 in FIG. 4.

Also, in the metal gasket 1A of the second embodiment shown in FIGS. 5, 6, in addition to the above-mentioned two sheets of first and second metal structural plates 10, 20, fourth and fifth metal structural plates 10A, 20A, which have the same shape, are laminated in such a way as to be symmetric to the laminated surface. According to the structure, in a plan view, the inner-periphery side beads 11, 21, 21A, 11A overlap, and the outer-periphery side beads 22, 22A overlap.

According to the metal gasket 1 (or 1A), in the inner-periphery side beads 11, 21, 31 (or 11, 21, 21A, 11A) forming a primary seal, the neighboring portion of the bolt hole 3, wherein the impact of the bolt fastening force is strong and the sealing surface pressure is apt to be large, receives compressibility and a low surface pressure by reducing the compression resistance. Also, the portion between the bolt holes 3, wherein the impact of the bolt fastening force is weak and the sealing surface pressure is apt to be small, receives a high surface pressure by increasing the compression resistance. Herewith, an approximately equal sealing surface pressure can be attained all around the sealing bore 2, so that an excellent sealing performance can be obtained. Also, deformation of sealing bore which is a gas exhaust channel can be prevented.

Also, in the outer-periphery side bead 22 (or 22, 22A) forming a secondary seal, the neighboring portion of the bolt hole 3, wherein the impact of the bolt fastening force is strong and the sealing surface pressure is apt to be large, has a larger sealing surface pressure by increasing the compression resistance, so that a flexural deformation of the flange of the exhaust manifold which is a joint surface of the metal gasket 1 (or 1A) is controlled. On the other hand, the portion between the bolt holes 3, wherein the impact of the bolt fastening force is weak and the sealing surface pressure is apt to be small, receives a low surface pressure by decreasing the compression resistance. As a result, compressibility and compatibility are enhanced, and sealing abilities are improved.

By combining the inner-periphery side beads 11, 21, 31 (or 11, 21, 21A, 11A) and the outer-periphery side bead 22 (or 22, 22A), in the neighboring portion of the bolt hole 3 and the other portions thereof (the portions between the bolt holes 3 and the like), when one of the beads is formed with a small compression resistance, the other of the beads is formed with a large compression resistance. As a result, in an overall structure of the combination of the beads, an approximately equal sealing surface pressure can be obtained. Therefore, excellent sealing abilities can be obtained. Also, the flexural deformation of the flange of the exhaust manifold or the exhaust pipe, which is the joint surface, can be controlled.

Incidentally, in the above, both inner-periphery side bead and the outer-periphery side bead are formed by the half bead. However, in the invention, they may be formed by full beads, and the shape of the bead is not particularly limited to the above-mentioned bead. When the bead is formed by the full bead, the cross-sectional shape of the bead may be an arc, sine (cosine), trapezoid, triangle (mountain shape) and the like.

The disclosure of Japanese Patent Application No. 2007-266709, filed on Oct. 12, 2007, is incorporated in the application.

While the invention has been explained with reference to the specific embodiments of the invention, the explanation is illustrative and the invention is limited only by the appended claims.

What is claimed is:

1. A metal gasket, comprising:
   at least one metal structural plate having a sealing bore and bolt holes located around the sealing bore;
   an inner bead formed on the at least one metal structural plate to surround the sealing bore, said inner bead having first neighboring portions near the bolt holes and first outer portions outside the first neighboring portions, the first neighboring portion having a compression resistance smaller than that of the first outer portion; and
   an outer bead formed on the at least one metal structural plate to surround the inner bead such that the bolt holes are located inside the outer bead, the outer bead having second neighboring portions near the bolt holes and second outer portions outside the second neighboring portions, the second neighboring portion having a compression resistance greater than that of the second outer portion.

2. A metal gasket according to claim 1, wherein the first neighboring portions and the first outer portions are arranged alternately, and the second neighboring portions and the second outer portions are arranged alternately.

3. A metal gasket according to claim 2, wherein the second neighboring portions are located outside the first neighboring portions relative to the sealing bore, and the second outer portions are located outside the first outer portions relative to the sealing bore.

4. A metal gasket, comprising:
   at least one metal structural plate having a sealing bore and bolt holes located around the sealing bore;
   an inner bead formed on the at least one metal structural plate to surround the sealing bore, said inner bead having first neighboring portions near the bolt holes and first outer portions outside the first neighboring portions, the first neighboring portion having a compression resistance smaller than that of the first outer portion; and
   an outer bead formed on the at least one metal structural plate to surround the inner bead such that the bolt holes are located inside thereof, the outer bead having second neighboring portions near the bolt holes and second outer portions outside the second neighboring portions, the second neighboring portion having a compression resistance greater than that of the second outer portion,
   wherein the first neighboring portions and the first outer portions are arranged alternately, and the second neighboring portions and the second outer portions are arranged alternately, wherein the second neighboring portions are located outside the first neighboring portions relative to the sealing bore, and the second outer portions are located outside the first outer portions relative to the sealing bore, and wherein the first neighboring portion has a bead width wider than that of the first outer portion so that the compression resistances of the inner bead are small at the first neighboring portions, and the second neighboring portion has a bead width narrower than that of the second outer portion so that the compression resistance of the outer bead is large at the second neighboring portions.

5. A metal gasket according to claim 4, wherein the at least one metal structural plate comprises first and second metal plates laminated with each other, the first metal plate having a first half bead and the outer bead, and the second metal plate having a second half bead disposed on the first half bead at the first neighboring portions and the first outer portions, the first and second half beads forming the inner bead.

6. A metal gasket according to claim 5, wherein the first and second half beads have slopes and are arranged such that inner periphery sides of the first and second half beads are spaced apart from each other and outer periphery sides thereof contact with each other, and the outer bead on the first metal plate is a half bead having a slope such that an inner periphery side thereof contacts the second metal plate and an outer periphery side thereof inclines toward an opposite side of the second metal plate.

7. A metal gasket according to claim 6, further comprising a third metal plate laminated on the first and second metal structural plates, the third metal plate having a third bead overlapping with the first and second half beads, the third bead having a slope such that an inner periphery side inclines toward the first metal plate and an outer periphery side inclines toward an opposite side of the first metal plate.

8. A metal gasket according to claim 5, wherein two pairs of the first and second metal plates are laminated symmetrically.

9. A metal gasket according to claim 1, wherein the outer bead partly surrounds the bolt holes without completely surrounding the bolt holes.

10. A metal gasket according to claim 9, wherein the first neighboring portion is located between the sealing bore and each of the bolt holes, and the second outer portion is located between two of the bolt holes.

* * * * *